United States Patent
Hsu (10) Patent No.: US 7,125,180 B2
(45) Date of Patent: Oct. 24, 2006

(54) COLLAPSIBLE KEYBOARD WITH SUPPORTING STRUCTURE

(75) Inventor: Chien-Shih Hsu, Taipei (TW)

(73) Assignee: Darfon Electronics Corp., Kweishan Taoyuan (TW)

( * ) Notice: Subject to any disclaimer, the term of this patent is extended or adjusted under 35 U.S.C. 154(b) by 0 days.

(21) Appl. No.: 10/788,110

(22) Filed: Feb. 26, 2004

(65) Prior Publication Data

US 2004/0175220 A1  Sep. 9, 2004

(30) Foreign Application Priority Data

Mar. 7, 2003  (TW) ............................... 92203532 U (51) Int. Cl.
*G06F 3/023* (2006.01)
(52) U.S. Cl. ..................... 400/489; 400/472
(58) Field of Classification Search ............... 400/489, 400/472
See application file for complete search history.

(56) References Cited

U.S. PATENT DOCUMENTS

| | | | | |
|---|---|---|---|---|
| 5,653,543 | A * | 8/1997 | Abe ............................ | 400/489 |
| 6,259,006 | B1 * | 7/2001 | Parienti ....................... | 84/171 |
| 6,390,699 | B1 * | 5/2002 | Lam ............................ | 400/472 |
| 6,421,235 | B1 * | 7/2002 | Ditzik ......................... | 361/683 |
| 6,552,281 | B1 * | 4/2003 | Katakami et al. ........... | 200/5 A |
| 6,587,096 | B1 * | 7/2003 | Bullister ...................... | 345/168 |
| 6,632,037 | B1 * | 10/2003 | Lin et al. ..................... | 400/472 |
| 6,641,043 | B1 * | 11/2003 | Plesko ................... | 235/462.33 |
| 6,679,639 | B1 * | 1/2004 | Katz .......................... | 400/488 |
| 6,798,649 | B1 * | 9/2004 | Olodort et al. ............. | 361/683 |
| 6,801,812 | B1 * | 10/2004 | Lin et al. ..................... | 700/84 |
| 6,839,002 | B1 * | 1/2005 | Olodort et al. ............... | 341/22 |
| 6,865,076 | B1 * | 3/2005 | Lunsford .................... | 361/684 |
| 2004/0033096 | A1 * | 2/2004 | Choi et al. ................. | 400/472 |
| 2004/0104897 | A1 * | 6/2004 | Mochizuki et al. ......... | 345/168 |
| 2004/0190230 | A1 * | 9/2004 | Mochizuki et al. ......... | 361/600 |
| 2005/0105952 | A1 * | 5/2005 | Mochizuki et al. ......... | 400/472 |

FOREIGN PATENT DOCUMENTS

| JP | 07-182811 | * | 2/1997 |
|---|---|---|---|
| JP | 10-219273 | * | 2/2000 |

* cited by examiner

*Primary Examiner*—Daniel J. Colilla
(74) *Attorney, Agent, or Firm*—Thomas, Kayden, Horstemeyer & Risley (57) ABSTRACT

A collapsible keyboard with supporting structures for an electronic device. The collapsible keyboard comprises a body, a first supporting structure and a second supporting structure. The body comprises a first section and a second section rotatably connected thereto. The first supporting structure rotatably connects to the first section. One end of the second supporting structure rotatably connects to the second section, with the other end connecting to the first supporting structure. When the first and second sections rotate to expand the body, the first and second supporting structures extend therewith to support the electronic device.

7 Claims, 9 Drawing Sheets

COLLAPSIBLE KEYBOARD WITH SUPPORTING STRUCTURE

BACKGROUND OF THE INVENTION

1. Field of the Invention

The present inventions relates to a portable keyboard and in particular to a collapsible keyboard in which a supporting structure rotates therewith to support an electronic device.

2. Description of the Related Art

Traditionally, collapsible keyboards connected to electronic devices usually utilize a supporting frame retractably disposed on the keyboard. The supporting frame is installed on one side of the keyboard for convenient placement in the keyboard. Thus, the keyboard and the supporting frame have to be expanded individually and inconvenient. Further, during use, the electronic device is regularly aligned with the center of the keyboard for convenient operating. Nevertheless, the supporting frame, not disposed at the center of the keyboard, does not enable such placement.

SUMMARY OF THE INVENTION

Therefore, an object of the present invention is to disclose a collapsible keyboard with a supporting structure that solves the above mentioned problems. The collapsible keyboard, when rotated to expand, rotates the supporting structure therewith. When the keyboard connects to an electronic device, the electronic device is disposed at the center of the keyboard for conveniently use.

The collapsible keyboard comprises a body, a first supporting structure and a second supporting structure. The body comprises a first section, and a second section rotatably connected thereto. The first supporting structure rotatably connects to the first section. One end of the second supporting structure rotatably connects to the second section, and the other end rotatably connects to the first supporting structure.

The collapsible keyboard may further comprise a flexible member. The second supporting structure connects to the first supporting structure via the flexible member such that the first and second supporting structures rotate together. The flexible member can be linear, band-shaped, or planar.

The flexible member may comprise a first flange, a second flange and a pin. The first flange connects to the first supporting structure, the second flange connects to the second supporting structure, and the pin connects the first and second flanges. The axial direction of the pin may be substantially perpendicular or parallel to the surface of the fully expanded body.

The collapsible keyboard may further comprise a hinge connecting the first and second sections.

The collapsible keyboard may further comprise a first leg and a second leg connected thereto. An end of the first leg connects to the first supporting structure. An end of the second leg connects to the second supporting structure. When the body is rotated to expand, the first and second supporting structures and legs rotate therewith, with an angle formed between two legs.

The collapsible keyboard may further comprise a first blade and a second blade. Two ends of the first blade connect to the first and second supporting structures respectively. Two ends of the second blade also connect to the first and second supporting structures respectively.

The first supporting structure may comprise a first recess and the second supporting structure comprises a second recess. One end of the first blade pivots with the first supporting structure, and the other end is movably received in the second recess. One end of the second blade pivots with the second supporting structure, and the other end is movably received in the first recess.

The first section may comprise a first groove and the second section a second groove. When the first and second sections rotate to collapse the body, the first supporting structure is received in the first groove and the second supporting structure in the second groove.

The collapsible keyboard may further comprise a first base and a second base. The first supporting structure connects to the first section via the first base. The second supporting structure connects to the second section via the second base. The first and second supporting structures rotate along a first direction and a second direction by way of the first and second bases. The first direction is parallel to the rotating direction of the first and second sections, and the second direction is perpendicular to the rotating direction of the first and second sections. Each base may comprise an angled face to limit the supporting structure.

The first base may comprise a first post and a first shaft and the second base may comprise a second post and a second shaft. The first supporting structure connects to the first base via the first post, and the first base connects to the first section via the first shaft. The second supporting structure connects to the second base via the second post, and the second base connects to the second section via the second shaft. The first post is substantially perpendicular to the first shaft, and the second post is substantially perpendicular to the second shaft.

DESCRIPTION OF THE DRAWINGS

The present invention can be more fully understood by reading the subsequent detailed description in conjunction with the examples and references made to the accompanying drawings, wherein:

FIG. 2a is a lateral view of the second embodiment;

DETAILED DESCRIPTION OF THE INVENTION

FIGS. 1a to 1d show a collapsible keyboard of a first embodiment in accordance with the present invention. The collapsible keyboard with supporting structures for an electronic device, such as a personal digital assistant (PDA), a mobile phone or the like, comprises a body 10, a first supporting structure 11 and a second supporting structure 12. The body 10 comprises a first section 13 and a second section 14 connected by a hinge 15. A plurality of keys 16 are disposed on the body 10. The first supporting structure 11 rotatably connects to the first section 13, one end of the second supporting structure 12 rotatably connects to the second section 14, and the other end rotatably connects to the first supporting structure 11. When the first and second sections 13 and 14 rotate to expand the body 10 of the keyboard, the first and second supporting structures 11 and 12 extend therewith, supporting the electronic device.

Figure 1A:
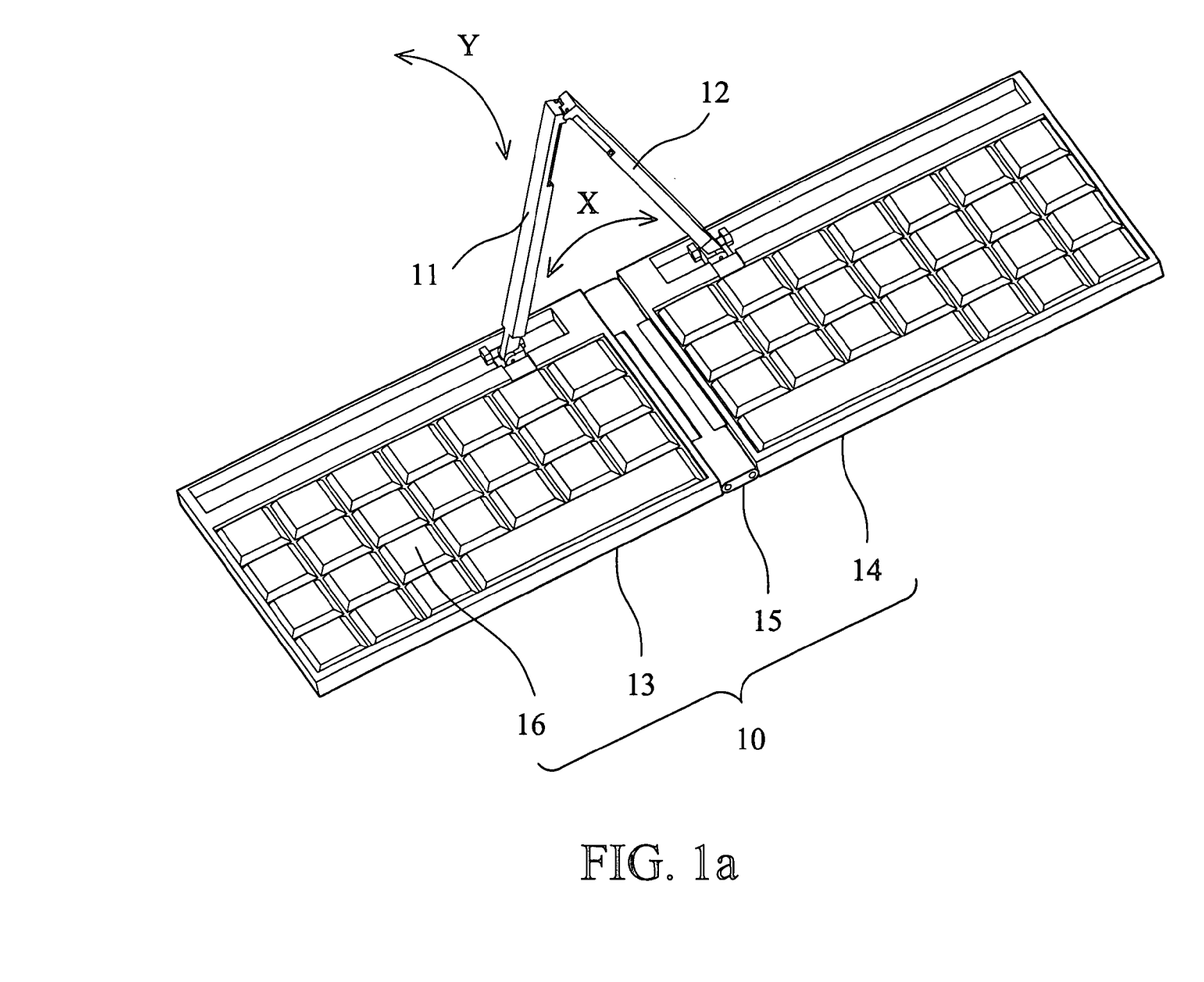
FIG. 1a is a schematic diagram of a collapsible keyboard of a first embodiment.
Figure 1B:
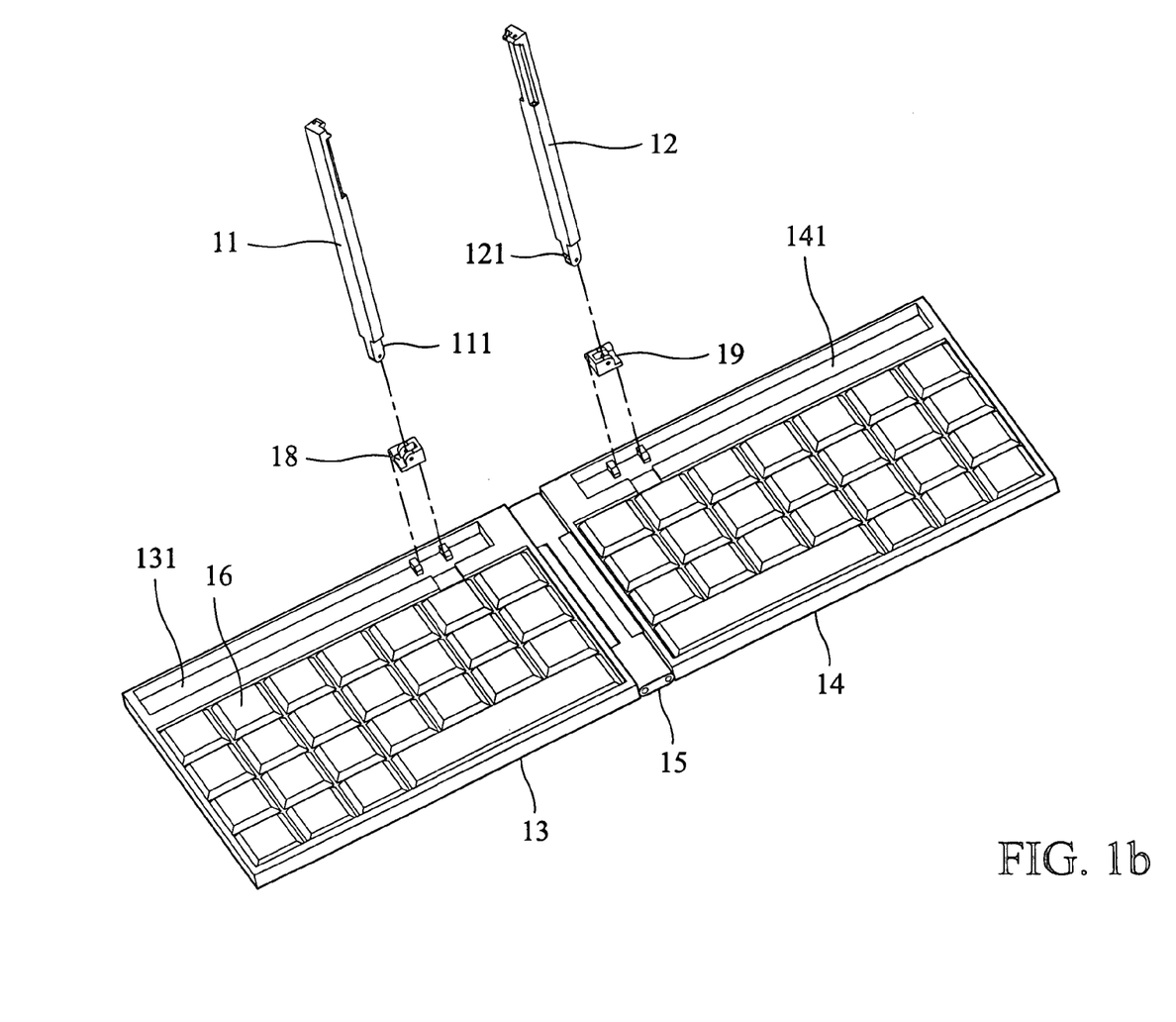
FIG. 1b is a partly exploded view of the first embodiment.

In this embodiment, the collapsible keyboard further comprises a first base 18 and a second base 19. The first supporting structure 11 connects to the first section 13 via the first base 18. The second supporting structure 12 connects to the second section 14 via the second base 19. The first and second supporting structures 11 and 12 can rotate along a first direction X and a second direction Y. The first direction X is parallel to the rotating direction of the first and second sections 13 and 14, and the second direction Y perpendicular to the rotating direction of the first and second sections 13 and 14. When rotated to expand the body 10, the supporting structures 11 and 12 extend along the first direction X until the body 10 is fully expanded, after which the first and second supporting structures 11 and 12 rotate along the second direction Y. The first and second supporting structures 11 and 12 thereby rotate and achieve an angle along the second direction Y, firmly supporting the electronic device.

Figure 1C:
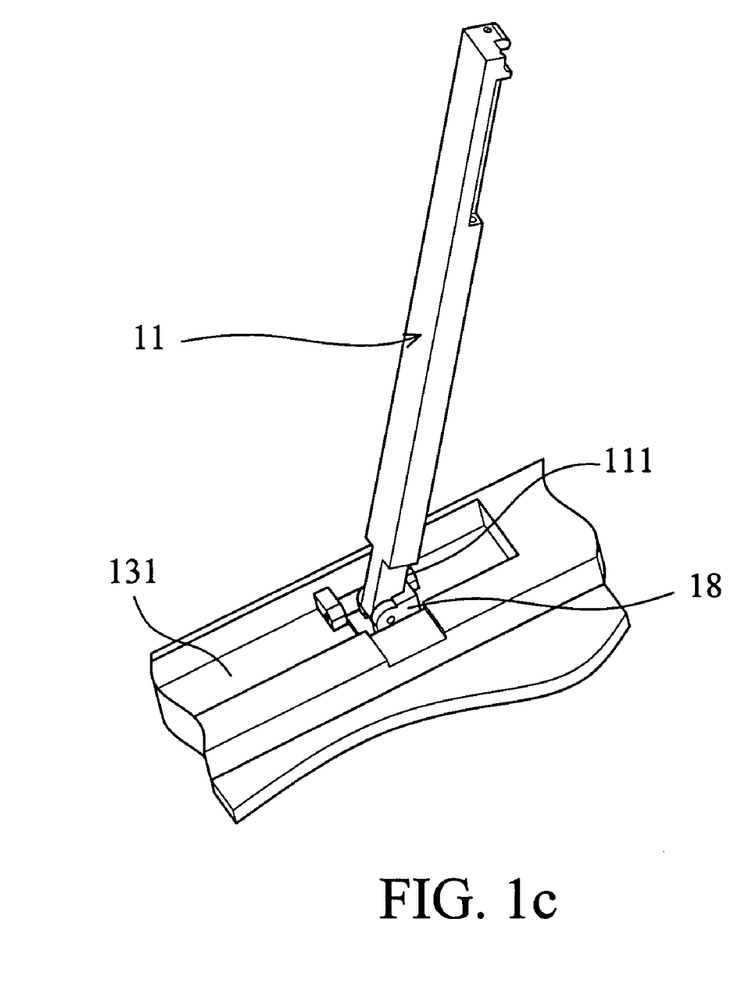
FIG. 1c is a local enlarged view of the first embodiment.

In this embodiment, the first section 13 has a first groove 131, and the second section 14 a second groove 141. The first supporting structure 11 has a first protrusion 111, and the second supporting structure 12 a second protrusion 121. FIG. 1c is local enlarged view of the first base 18 disposed in the first groove 18. When the body 10 expands, the first supporting structure 11 rotates and arises along the first direction X until the first protrusion 111 abuts an angled face 181 of the first base 18. The first supporting structure 11 then drags the second supporting structure 12 to extend until the body 10 is fully expanded. The supporting structures 11 and 12 are shown thus in FIG. 1a. When the body 10 expands, the first and second supporting structures 11 and 12 rotate therewith. Location and rotation of the first base 18 and the second base 19 are symmetrically arranged according to the hinge 15. The supporting structures 11 and 12 can be fully received in the first groove 131 and the second groove 141 respectively when the body 10 collapses.

Figure 1D:
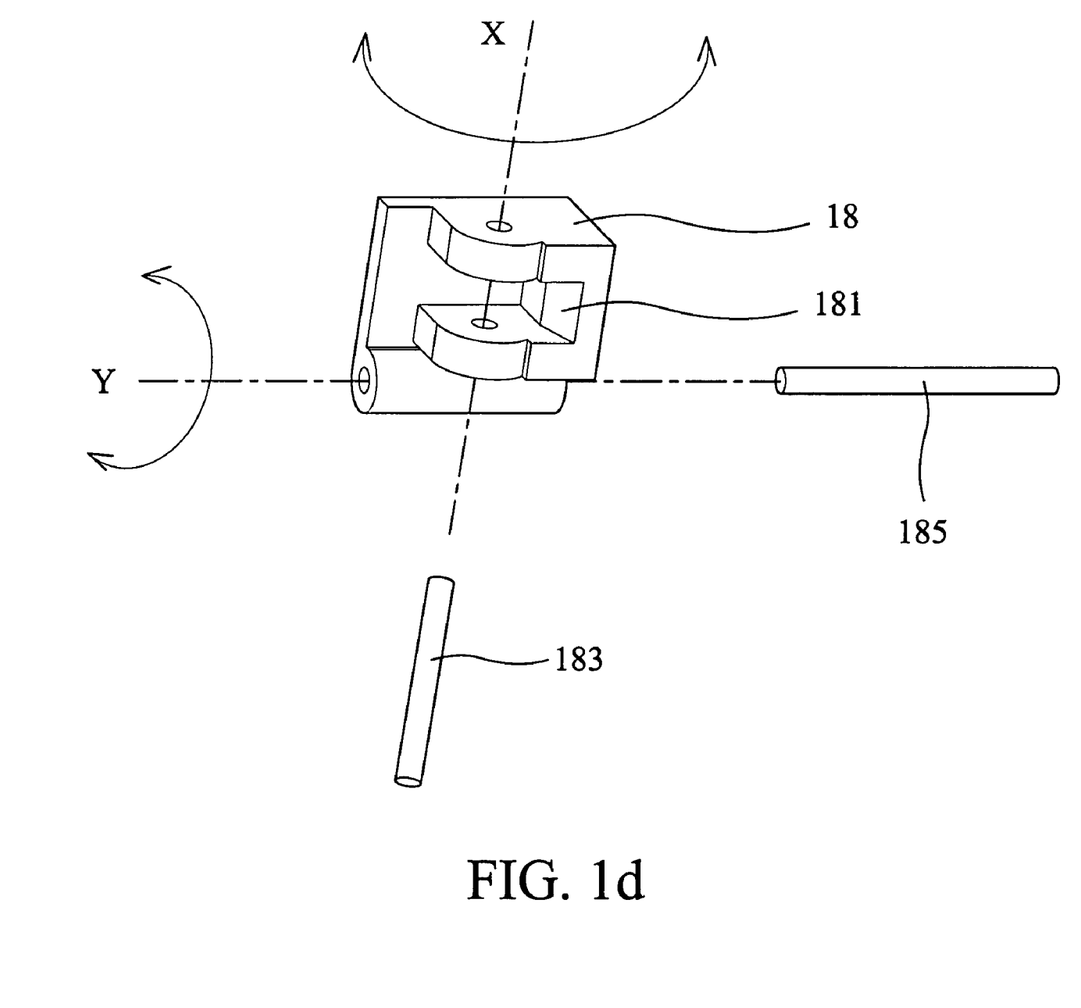
FIG. 1d is another local enlarged view of the first embodiment.

FIG. 1d is an enlarged view of the first base 18 (the second base 19 is identical), comprising a first post 183 and a first shaft 185. The first supporting structure 11 connects to the first base 18 via the first post 183, and the first base 18 connects to the first section 13 via the first shaft 185. Similarly (not shown in Figures), the second base 19 comprises a second post and a second shaft. The second supporting structure 12 connects to the second base 19 via the second post, and the second base 19 connects to the second section 14 via the second shaft. The first post 183 is perpendicular to the first shaft 185, and the second post is perpendicular to the second shaft. Thus, the first and second supporting structures 11 and 12 and bases 18 and 19 rotate along the first direction X and the second direction Y.

In this embodiment, the first and second supporting structures 11 and 12 are symmetrically arranged on the first and second sections 13 and 14 respectively, according to the hinge 15. Additionally, asymmetrical arrangement of the first and second supporting structures 11 and 12 is also practicable.

Connection of the first and second supporting structures 11 and 12 to the first and second sections 13 and 14 as mentioned is given as an example, is not limited to the invention to the disclosed embodiments, and can vary with demand.

Figure 2A:
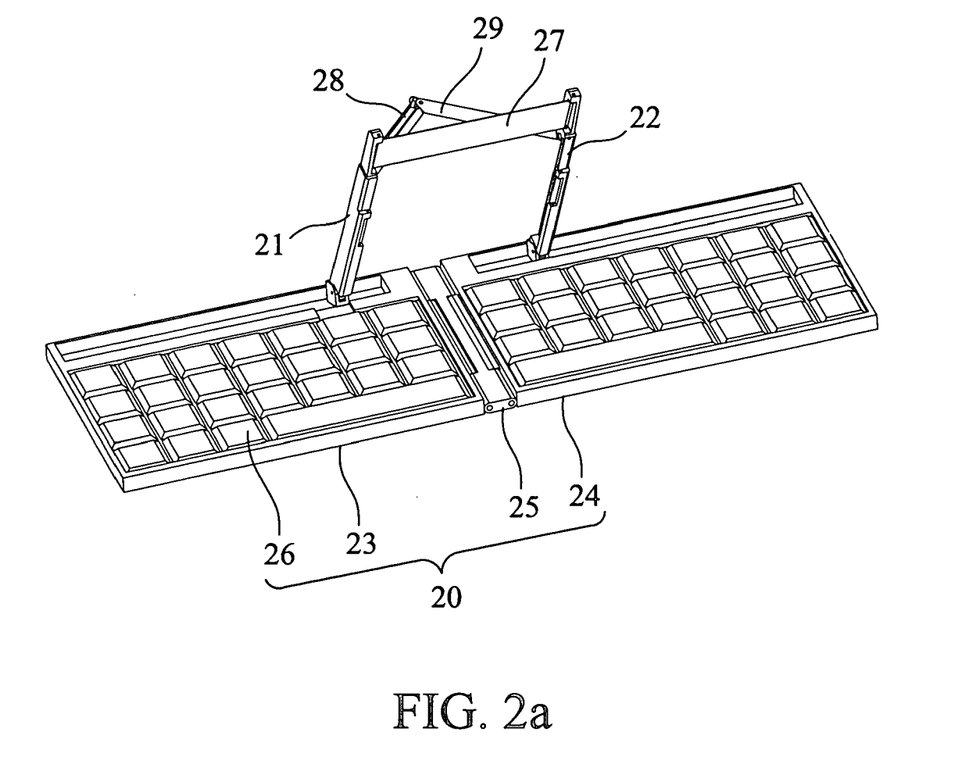
FIG. 2a is a schematic diagram of a collapsible keyboard of a second embodiment.
Figure 2B:
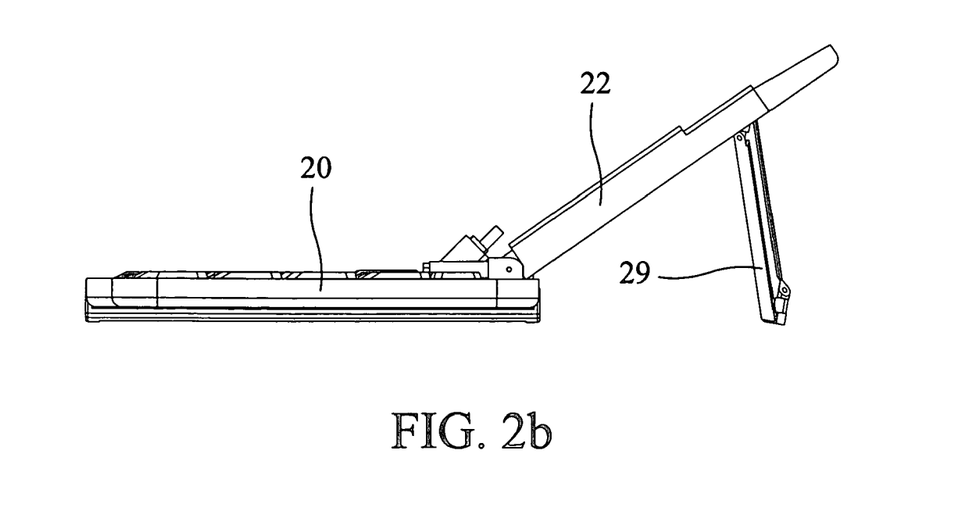

FIGS. 2a and 2b show a collapsible keyboard of a second embodiment in accordance with the present invention. The collapsible keyboard with supporting structures for an electronic device, such as a personal digital assistant (PDA), a mobile phone or the like, comprises a body 20, a first supporting structure 21, a second supporting structure 22 and a flexible member 27. The body 20 comprises a first section 23 and a second section 24 connected by a hinge 25. A plurality of keys 26 are disposed on the body 20. The first supporting structure 21 rotatably connects to the first section 23, and the second supporting structure 22 rotatably connects to the second section 24. The flexible member 27 connects the first and second supporting structures 21 and 22. When the first and second sections 23 and 24 rotate to expand the body 20 of the keyboard, the first and second supporting structures 21 and 22 extend therewith, supporting the electronic device.

The collapsible keyboard further comprises a first leg 28 and a second leg 29 rotatably connected thereto. The free end of the first leg 28 connects to the first supporting structure 21, and the second leg 29 to the second supporting structure 22. When the body 20 of the keyboard rotates to expand, the first and second supporting structures 21 and 22 extend therewith, supporting the electronic device, with an angle formed between the first and second legs 28 and 29 as shown thus in FIG. 2b, such that the first and second legs 28 and 29 assist the supporting structures 21 and 22 in supporting the electronic device. As mentioned in the first embodiment, after extending, the first and second supporting structures 21 and 22 form an angle, stably supporting and positioning the electronic device.

In this embodiment, the first and second supporting structures 21 and 22 are symmetrically arranged on the first and second sections 23 and 24 respectively, according to the hinge 25. However, asymmetrical arrangement is also practicable.

Moreover, the flexible member 27 of the present invention is planar, such as band-shaped or fabric. The line-shaped of the flexible member 27 is also practicable.

Figure 3:
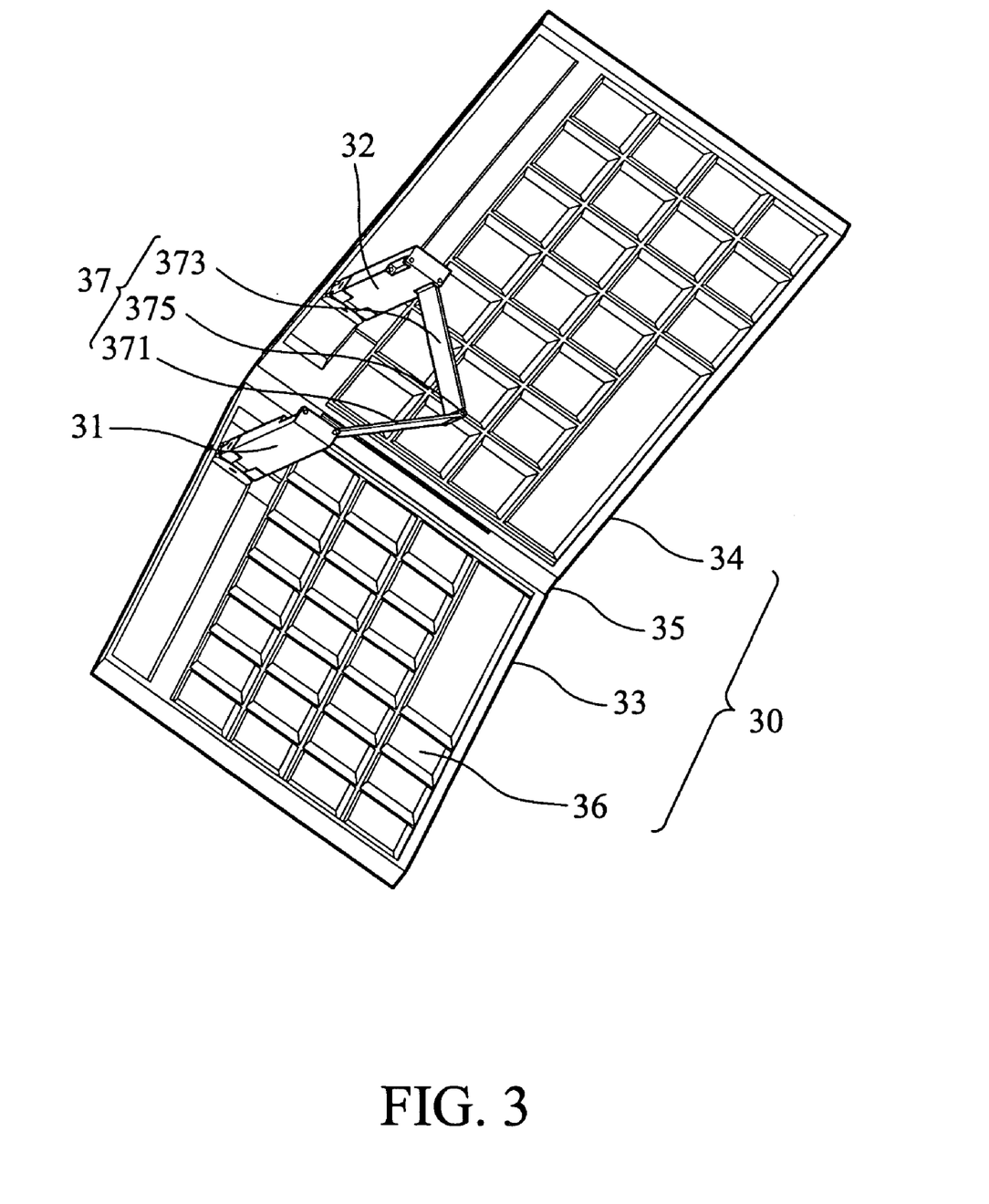
FIG. 3 is a schematic diagram of a collapsible keyboard of a third embodiment.

FIG. 3 shows a collapsible keyboard of a third embodiment in accordance with the present invention. The collapsible keyboard with supporting structure for an electronic device, such as a personal digital assistant (PDA), a mobile phone or the like, comprises a body 30, a first supporting structure 31, a second supporting structure 32 and a flexible member 37. The body 30 comprises a first section 33 and a second section 34 connected by a hinge 35. A plurality of keys 36 are disposed on the body 30. The flexible member 37 comprises a first flange 371, a second flange 373 and a pin 375. The first supporting structure 31 rotatably connects to the first section 33, and the second supporting structure 32 rotatably connects to the second section 34. The flexible member 37 connects the first and second supporting structures 31 and 32. Namely, the first flange 371 connects to the first supporting structure 31, the second flange 373 connects to the second supporting structure 32, and the pin 375 connects the first and second flanges 371 and 373. When the first and second sections 33 and 34 rotate to expand the body 30 of the keyboard, the first and second supporting structures 31 and 32 extend therewith, supporting the electronic device. At this time, the direction of the pin 375 is perpendicular to the surface of the fully expanded body 30.

As mentioned in the above embodiments, after extending until the body 30 is fully expanded, the first and second supporting structures 31 and 32 achieve an angle, firmly supporting and positioning the electronic device.

Moreover, in this embodiment, the first and second supporting structures 31 and 32 are symmetrically arranged on the first and second sections 33 and 34 respectively, according to the hinge 35. However, asymmetrical arrangement is also practicable.

Figure 4A:
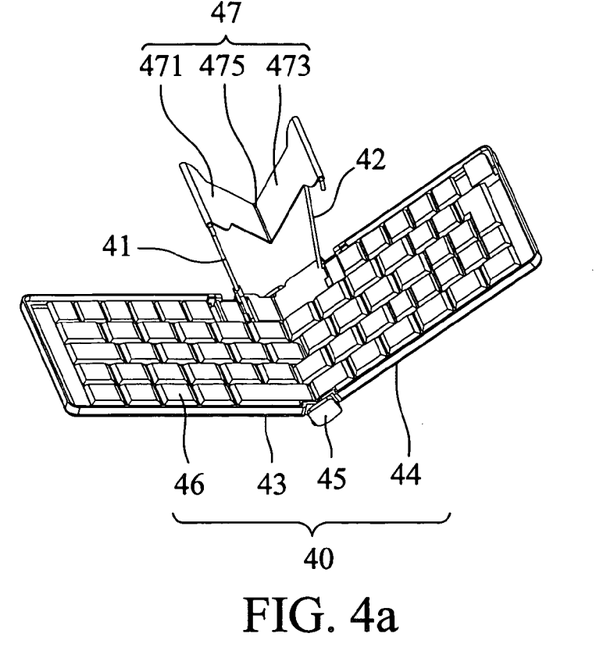
FIG. 4a is a schematic diagram of a collapsible keyboard of a fourth embodiment.
Figure 4B:
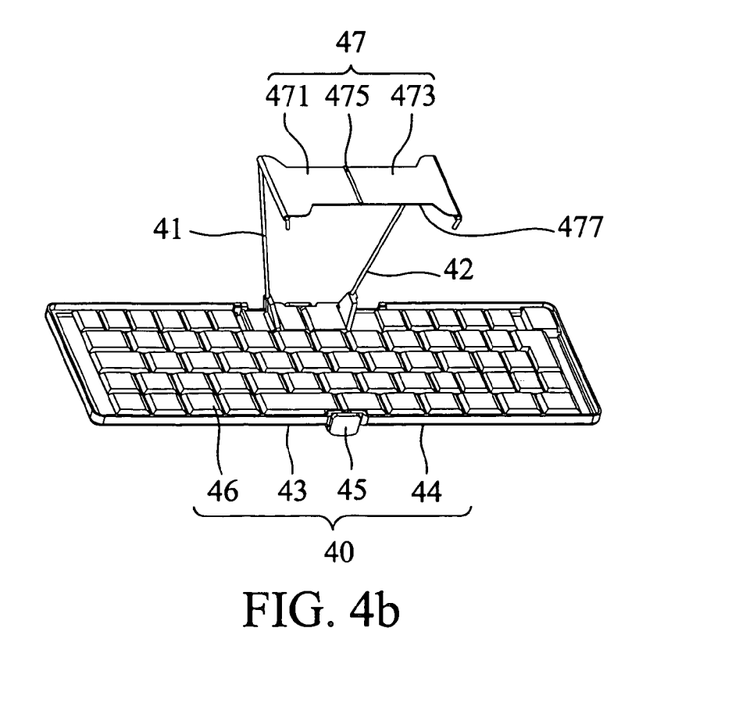
FIG. 4b is another schematic diagram of the fourth embodiment.

FIGS. 4a and 4b show a collapsible keyboard of a fourth embodiment in accordance with the present invention. FIG. 4a shows the collapsible keyboard only partially expanded, and FIG. 4b fully expanded. The collapsible keyboard with supporting structures for an electronic device, such as a personal digital assistant (PDA), a mobile phone or the like, comprises a body 40, a first supporting structure 41, a second supporting structure 42 and a flexible member 47. In this embodiment, the first and second supporting structures 41 and 42 are L-shaped. The body 40 comprises a first section 43 and a second section 44 connected by a hinge 45. A plurality of keys 46 are disposed on the body 40. The flexible member 47 comprises a first flange 471, a second flange 473 and a pin 475. The first supporting structure 41 rotatably connects to the first section 43, and the second supporting structure 42 rotatably connects to the second section 44. The flexible member 47 connects the first and second supporting structures 41 and 42. Namely, the first flange 471 connects to the first supporting structure 41, the second flange 473 connects to the second supporting structure 42, and the pin 475 connects the first and second flanges 471 and 473. When the first and second sections 43 and 44 rotate to expand the body 40 of the keyboard, the first and second supporting structures 41 and 42 extend therewith. The leaned flexible member 47 with a leading edge 477 supports the electronic device. At this time, the direction of the pin 475 is parallel to the surface of the fully expanded body 40.

As mentioned in the above embodiments, after extending until the body 40 is fully expanded, the first and second supporting structures 41 and 42 achieve an angle, firmly supporting and positioning the electronic device.

Moreover, in this embodiment, the first and second supporting structures 41 and 42 are symmetrically arranged on the first and second sections 43 and 44 respectively, according to the hinge 45. However, asymmetrical arranged is also practicable.

Figure 5A:
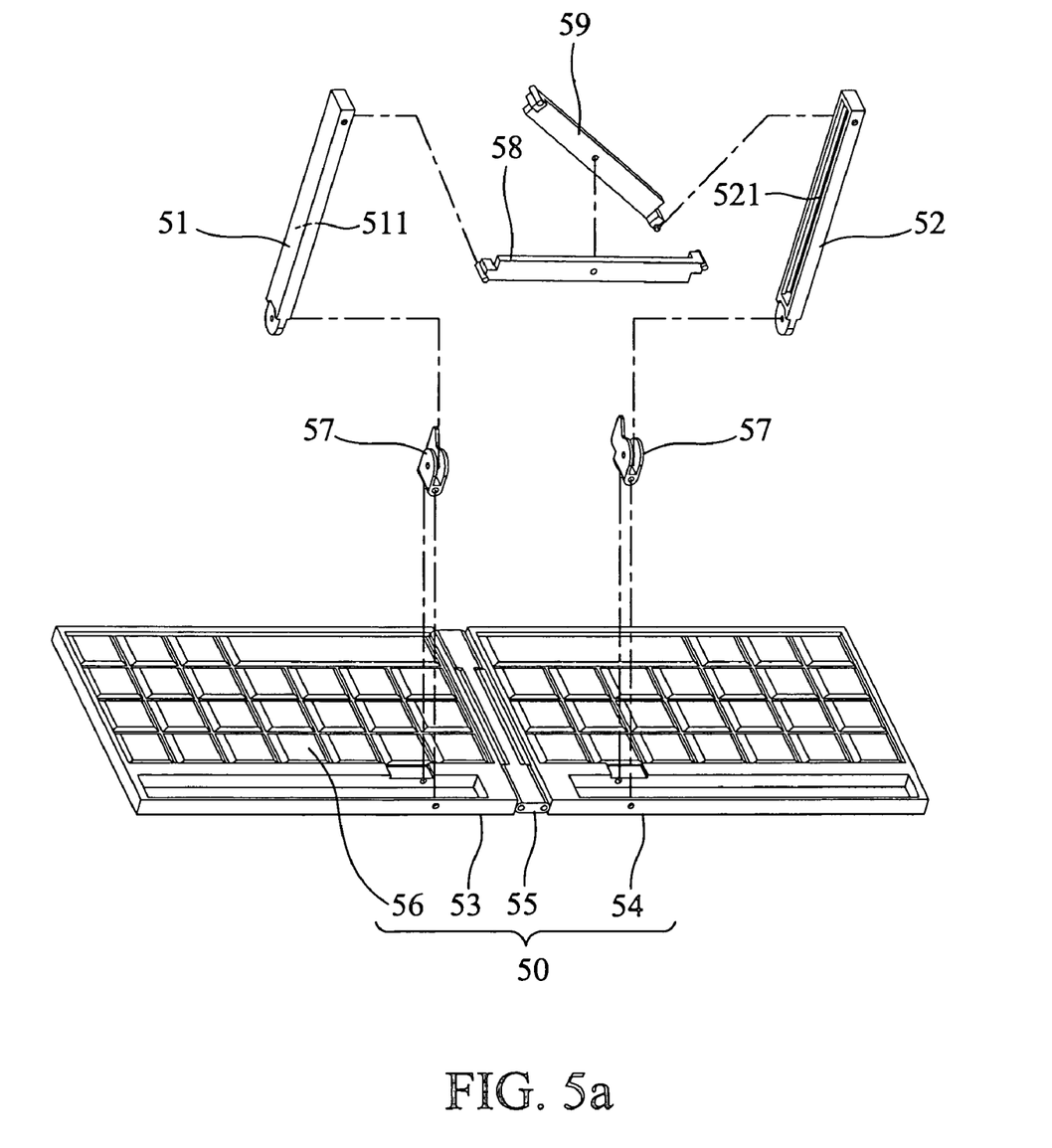
FIG. 5a is a partly exploded view of a collapsible keyboard of a fifth embodiment.
Figure 5B:
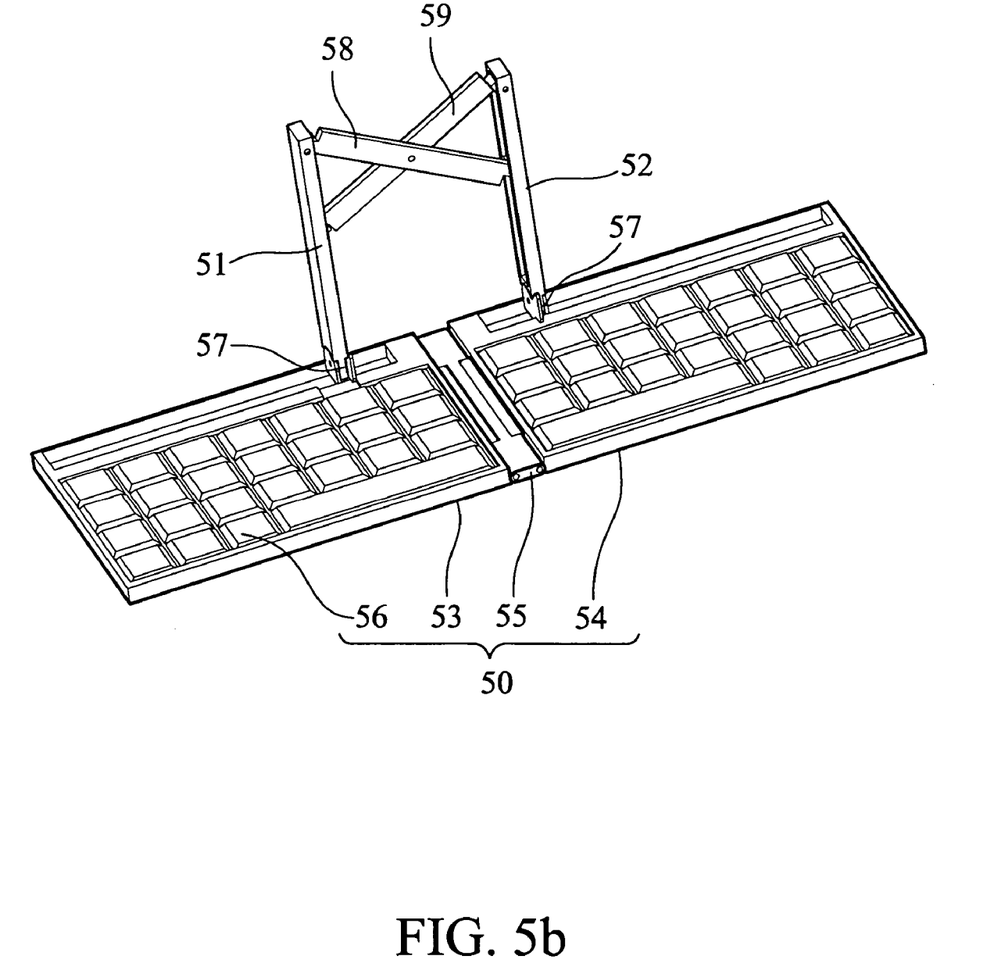
FIG. 5b is schematic diagram of the fifth embodiment.

FIGS. 5a and 5b show a collapsible keyboard of a fifth embodiment in accordance with the present invention. The collapsible keyboard with supporting structure for an electronic device, such as a personal digital assistant (PDA), a mobile phone or the like, comprises a body 50, a first supporting structure 51, a second supporting structure 52, two base 57, a first blade 58 and a second blade 59. The body 50 comprises a first section 53 and a second section 54 connected by a hinge 55. A plurality of keys 56 are disposed on the body 50. The first supporting structure 51 comprises a first recess 511, and the second supporting structure 52 comprises a second recess 521. The first supporting structure 51 rotatably connects to the first section 53 via the base 57, and the second supporting structure 52 rotatably connects to the second section 54 via another base 57. One end of the first blade 58 pivots with the first supporting structure 51, and the other end movably connects and receives in the second recess 521. One end of the second blade 59 pivots with the second supporting structure 52, and the other end moveably connects and is received in the first recess 511. The first blade 58 intersects with the second blade 59. When the first and second sections 53 and 54 rotate to expand the body 50 of the keyboard, the first and second supporting structures 51 and 52 extend therewith, as shown in FIG. 5b, supporting the electronic device.

While, in this embodiment, the first and second supporting structures 51 and 52 connecting to the base 57 are identical to those described in the first embodiment, the disposition thereof is exemplary and is not intended to limit the invention to the disclosed embodiments, variable with demand.

After extending until the body 50 is fully expanded, the first and second supporting structures 51 and 52 achieve an angle as shown in the first embodiment, firmly supporting and positioning placing the electronic device.

Moreover, in this embodiment, the first and second supporting structures 51 and 52 are symmetrically arranged on the first and second sections 53 and 54 respectively, according to the hinge 55. However, asymmetrical arranged is also practicable.

As mentioned, the first blade 58 and the second blade 59 can be two retractable bars. Two ends of first blade 58 connect to the first and second supporting structures 51 and 52 respectively, and two ends of the second blade 59 also connect respectively. Thus, the first recess 511 of the first supporting structure 51 and the second recess 521 of the second supporting structure 52 are not required.

Finally, while the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A collapsible keyboard, comprising:
    a body comprising a first section and a second section rotatably connected thereto;
    a first supporting structure connected to the first section and;
    a second supporting structure, one end of which is connected to the second section, with the other end connected to the first supporting structure,
    wherein when the first and second sections rotate to expand the body, the first and second supporting structures are rotated by the first and second sections and deploy operative to position the body simultaneously and support an electronic device, an angle is formed between a first plane and a second plane, the first plane is formed by the expanded body, and the second plane is formed by the deployed first and second supporting structures; and
    a flexible member, wherein the second supporting structure connects to the first supporting structure via the flexible member such that the first and second supporting structures rotate together, wherein the flexible member comprises a first flange, a second flange, and a pin, the first flange connecting to the first supporting structure, the second flange connecting to the second supporting structure, the pin connecting the first and second flanges, with the axial direction of the pin substantially parallel to the surface of the fully expanded body.

2. A collapsible keyboard, comprising:
    a body comprising a first section and a second section rotatably connected thereto;
    a first supporting structure connected to the first section and;

a second supporting structure, one end of which is connected to the second section, with the other end connected to the first supporting structure, wherein when the first and second sections rotate to expand the body, the first and second supporting structures are rotated by the first and second sections and deploy operative to position the body simultaneously and support an electronic device, an angle is formed between a first plane and a second plane, the first plane is formed by the expanded body, and the second plane is formed by the deployed first and second supporting structures; and a first leg and a second leg connected thereto, wherein an end of the first leg connects to the first supporting structure, with an end of the second leg connecting to the second supporting structure, wherein when the body rotated to expand, the first and second supporting structures and legs extend therewith, thereby an angle is formed between the first and second legs.

3. A collapsible keyboard, comprising:

a body comprising a first section and a second section rotatably connected thereto;

a first supporting structure connected to the first section and;

a second supporting structure, one end of which is connected to the second section, with the other end connected to the first supporting structure, wherein when the first and second sections rotate to expand the body, the first and second supporting structures are rotated by the first and second sections and deploy operative to position the body simultaneously and support an electronic device, an angle is formed between a first plane and a second plane, the first plane is formed by the expanded body, and the second plane is formed by the deployed first and second supporting structures; and a first blade and a second blade, wherein two ends of the first blade connect to the first and second supporting structures respectively, and two ends of the second blade also connect to the first and second supporting structures respectively, and the first blade is connected to the second blade, wherein the first supporting structure comprises a first recess and the second supporting structure comprises a second recess, with one end of the first blade pivoting with the first supporting structure, and the other end movably received in the second recess, wherein one end of the second blade pivots with the second supporting structure, and the other end is movably received in the first recess.

4. A collapsible keyboard, comprising:

a body comprising a first section and a second section rotatably connected thereto;

a first supporting structure connected to the first section and;

a second supporting structure, one end of which is connected to the second section, with the other end connected to the first supporting structure, wherein when the first and second sections rotate to expand the body, the first and second supporting structures are rotated by the first and second sections and deploy operative to position the body simultaneously and support an electronic device, an angle is formed between a first plane and a second plane, the first plane is formed by the expanded body, and the second plane is formed by the deployed first and second supporting structures, and wherein the first section comprises a first groove and the second section comprises a second groove, wherein when the first and second sections rotate to collapse the body, the first supporting structure is received in the first groove and the second supporting structure is received in the second groove.

5. A collapsible keyboard, comprising:

a body comprising a first section and a second section rotatably connected thereto;

a first supporting structure connected to the first section and;

a second supporting structure, one end of which is connected to the second section, with the other end connected to the first supporting structure, wherein when the first and second sections rotate to expand the body, the first and second supporting structures are rotated by the first and second sections and deploy operative to position the body simultaneously and support an electronic device, an angle is formed between a first plane and a second plane, the first plane is formed by the expanded body, and the second plane is formed by the deployed first and second supporting structures; and a first base and a second base, wherein the first supporting structure connects to the first section via the first base, the second supporting structure connects to the second section via the second base, and the first and second supporting structures rotate along a first direction and a second direction by the first and second bases, and the first direction is parallel to the rotating direction of the first and second sections, and the second direction is perpendicular to the rotating direction of the first and second sections.

6. The collapsible keyboard as claimed in claim 5, wherein the first and second bases comprise an angled face to limit the first and second supporting structures.

7. The collapsible keyboard as claimed in claim 5, wherein the first base comprises a first post and a first shaft and the second base comprises a second post and a second shaft, with the first supporting structure connecting to the first base via the first post, the first base connecting to the first section via the first shaft, the second supporting structure connecting to the second base via the second post, and the second base connecting to the second section via the second shaft, wherein the first post is substantially perpendicular to the first shaft, and the second post is substantially perpendicular to the second shaft.

* * * * *